United States Patent
Heigl et al.

(10) Patent No.: US 7,784,823 B2
(45) Date of Patent: Aug. 31, 2010

(54) VEHICLE OCCUPANT RESTRAINT SYSTEM

(75) Inventors: Juergen Heigl, Boebingen (DE); Anton Fischer, Schechingen (DE)

(73) Assignee: TRW Automotive GmbH, Alfdorf (DE)

( * ) Notice: Subject to any disclaimer, the term of this patent is extended or adjusted under 35 U.S.C. 154(b) by 211 days.

(21) Appl. No.: 11/986,168

(22) Filed: Nov. 20, 2007

(65) Prior Publication Data

US 2008/0129023 A1 Jun. 5, 2008

(30) Foreign Application Priority Data

Nov. 30, 2006 (DE) .................. 10 2006 056 603

(51) Int. Cl.
*B60R 21/213* (2006.01)
*B60R 21/231* (2006.01)
*B60R 21/237* (2006.01)

(52) U.S. Cl. .................. 280/730.2; 280/743.1

(58) Field of Classification Search .............. 280/730.2, 280/730.1, 743.1

See application file for complete search history.

(56) References Cited

U.S. PATENT DOCUMENTS

| 5,470,103 | A | * | 11/1995 | Vaillancourt et al. | ..... 280/730.1 |
| 6,722,691 | B1 | * | 4/2004 | Håland et al. | ............ 280/730.1 |
| 2002/0140209 | A1 | * | 10/2002 | Waid et al. | ................ 280/728.2 |
| 2002/0180192 | A1 | * | 12/2002 | Tanase et al. | ............ 280/730.2 |

* cited by examiner

*Primary Examiner*—Paul N Dickson
*Assistant Examiner*—Keith Frisby
(74) *Attorney, Agent, or Firm*—Tarolli, Sundheim, Covell & Tummino LLP

(57) ABSTRACT

A vehicle occupant restraint system has a side gas bag which is arranged folded along a roof frame of a vehicle. The side gas bag is configured such that in an inflated condition a front inflatable section at a front end of the side gas bag projects further into the vehicle interior than an inflatable portion adjoining the front inflatable section in the longitudinal direction of the vehicle.

14 Claims, 7 Drawing Sheets

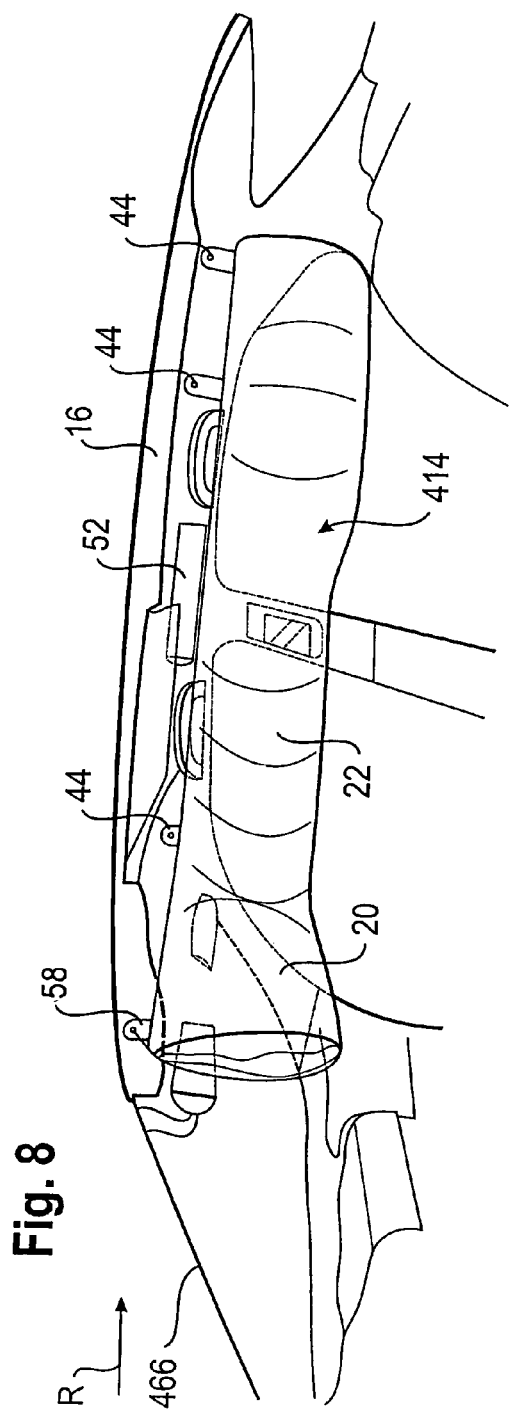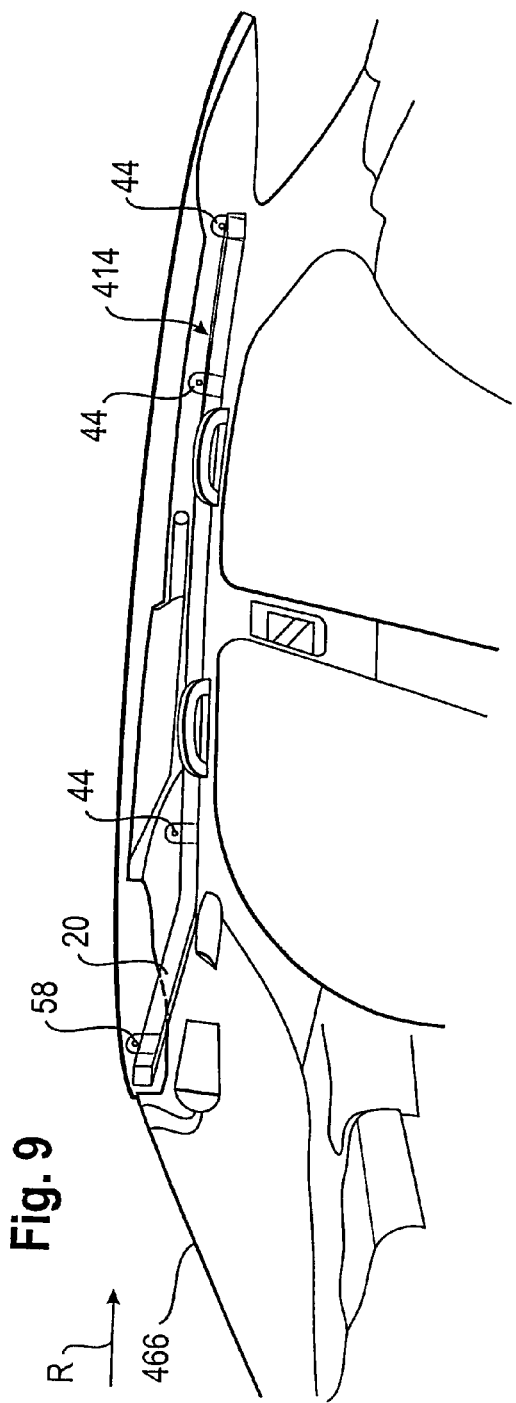

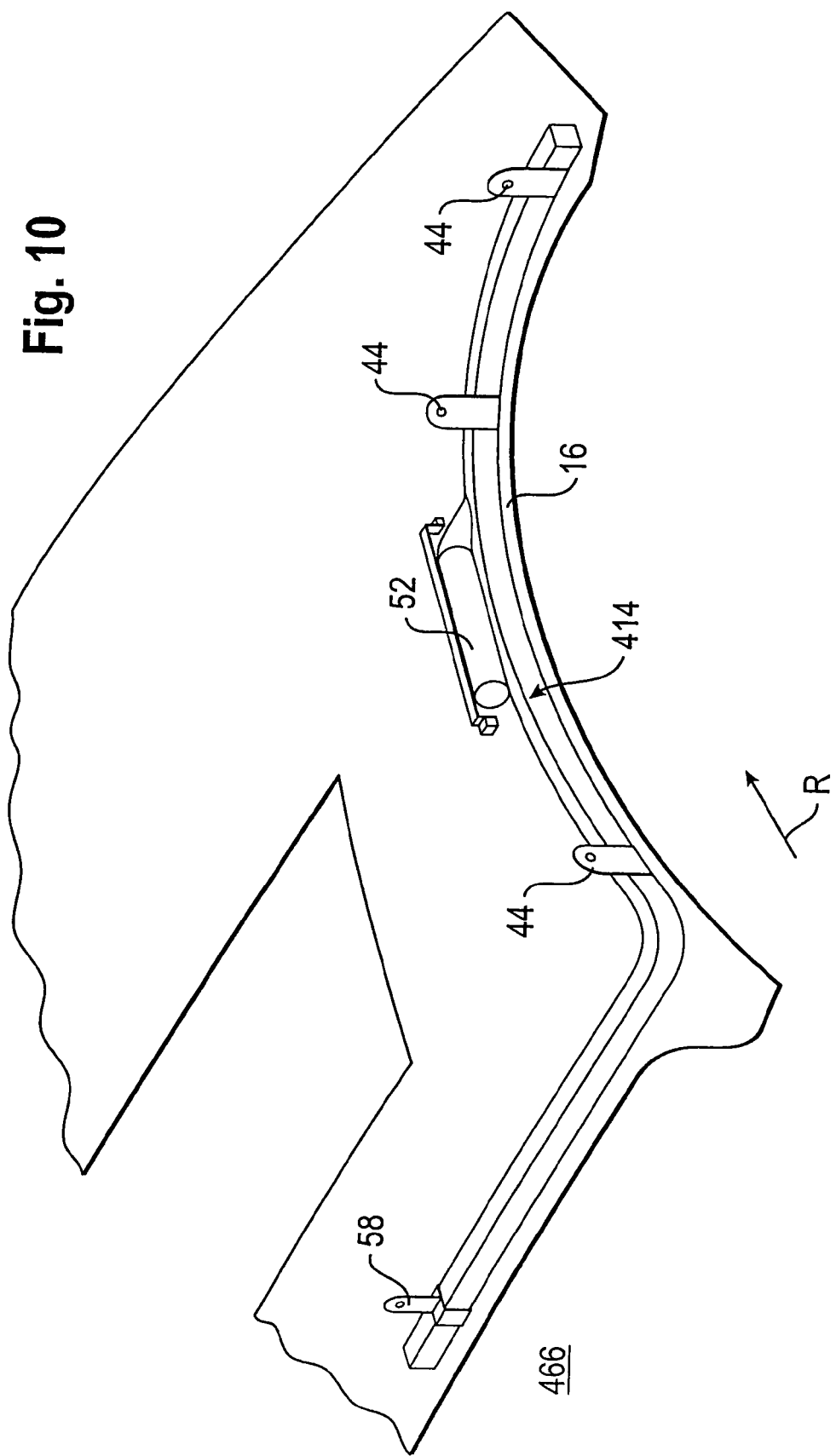

VEHICLE OCCUPANT RESTRAINT SYSTEM

FIELD OF THE INVENTION

The present invention relates to a vehicle occupant restraint system.

BACKGROUND OF THE INVENTION

Front gas bags that emerge from the steering wheel or the instrument panel, in combination with curtain-type side gas bags that deploy from the area of the roof frame of the vehicle, currently constitute a standard in vehicle occupant restraint systems since good protection can be achieved in this way in the event of a head-on or lateral impact.

It is an object of the invention to improve a vehicle occupant restraint system so as to optimize the protection provided to a vehicle occupant in the event of an oblique impact.

BRIEF SUMMARY OF THE INVENTION

To this end, a vehicle occupant restraint system has a side gas bag which is arranged folded along a roof frame of a vehicle. The side gas bag is configured such that in an inflated condition a front inflatable section at a front end of the side gas bag projects further into the vehicle interior than an inflatable portion adjoining the front inflatable section in the longitudinal direction of the vehicle. Even if the inflatable portion has protrusions and intrusions (e.g. at locations where limiting straps or chamber walls are attached to the outer gas bag wall), the theoretical envelope contacting the outer protrusions defines a theoretical inner side projecting further into the vehicle interior at the front section than the inflatable portion. Especially in the event of an oblique impact and also when an occupant is involved who has not buckled up, the large extension of the front inflatable section into the vehicle interior helps avoid a contact between the occupant and the A-pillar.

In this connection it is advantageous if the front inflatable section covers part of the A-pillar of the vehicle.

The side gas bag is preferably of a curtain-type design, and the inflatable front section is part of this curtain-type side gas bag.

In the inflated condition, the inflatable portion adjoining the front inflatable section is preferably located to the side of the occupant, e.g. in front of or in the region of the B-pillar of the vehicle.

The division between the front inflatable section and the adjacent inflatable portion can be of a physical nature, e.g. by a non-inflatable section that separates the two portions wholly or partly, but such division may also be of a purely imaginary nature, so that the front inflatable section and the adjoining inflatable portion are formed by one single continuous inflatable chamber.

The front inflatable section preferably forms a ramp that is directed into the vehicle interior and that, upon an impact, specifically in the event of an oblique impact, can guide the vehicle occupant e.g. away from the A-pillar and into a front gas bag situated in front of the vehicle occupant.

The front inflatable section may exhibit a curvature into the vehicle interior which may also be made use of to form a ramp, since the curvature formed in this way causes the occupant to be deflected towards the vehicle interior upon the impact and thus to be kept away from the A-pillar.

The curvature can be brought about by at least one gathered seam, for example. Preferably, the gathered seam connects sections of the wall of the side gas bag facing the vehicle interior. In this way, the wall is shortened at the front end of the side gas bag as viewed in the longitudinal direction of the vehicle, so that the inflated side gas bag will bend towards the vehicle interior. In this case, the thickness of the side gas bag, that is to say, the distance between the inboard and outboard walls of the gas bag, could be roughly the same over the entire front inflatable section. The increase in depth towards the vehicle interior is brought about at least in part by the curvature of the side gas bag. A gathered seam constitutes a simple and low-cost measure to change the shape of the gas bag. It is further of advantage that such seam does not need much additional space in the folded gas bag package.

Alternatively or additionally, an upper edge of the front inflatable section may run in a wavy shape. For this purpose, at the upper edge of the side gas bag, for example, which—in the installed and inflated condition—is located above the first inflatable section, provision is made for at least one incision which extends over approximately 10 to 50% of the height of the side gas bag. The central idea here is to provide the upper edge of the front inflatable section, which in the inflated condition extends preferably freely, with a greater length than the profile of the outer contour of the side gas bag along the roof frame in this area. This makes some excess material available for the upper edge of the front inflatable section, so that in the inflated condition the result is a curvature of this section into the interior of the vehicle.

This effect can be enhanced in that, especially in the area of the lower edge of the side gas bag, opposite the upper edge, means are provided which limit the distance of the gas bag walls in the inflated condition. These means may be formed by, e.g., limiting straps or so-called X-tethers, which consist of warp or weft threads of a gas bag wall and come out of the composite threads of one gas bag wall, run obliquely through the inside of the gas bag and enter the composite threads of the other gas bag wall; if required, they may be connected with one another in between.

Another way to attain a larger extension of the front inflatable section into the vehicle interior is to design the side gas bag such that in the inflated condition, the side gas bag is folded over in the region of the front inflatable section, so that a first inflatable partial section lies on a second inflatable partial section. In other words, in the region of the front inflatable section the side gas bag is folded back onto itself, so that the gas bag is multilayered in this region.

The side gas bag is preferably configured in such a way that in the flat spread out condition, first and second partial sections of the front inflatable section, which in the installed and inflated condition of the side gas bag lie on top of each other, are arranged in the same plane. This means that the side gas bag can be manufactured by stitching or weaving like a normal side gas bag with two superimposed walls.

Preferably, the two partial sections adjoin each other such that they may be simply placed one over the other.

Each of the partial sections advantageously has one or more attachment points which are arranged such that in the installed condition they lie one on top of the other and can each be fixed in position at the same place of the vehicle. It is therefore not required to attach the partial sections separately to the side gas bag.

In a flat spread out condition, the side gas bag may have e.g. two attachment points on the edge of the front inflatable section which lie one on top of the other when the side gas bag is installed in the vehicle and is in its inflated condition.

In this case, one of the partial sections of the front inflatable section is, for example, folded over along a line running through a point at the lower edge of the side gas bag. In this case, the two partial sections have a substantially triangular shape.

In the flat spread out condition, a section at the front end of the side gas bag may project beyond a prolongation of a straight, lower edge section of the side gas bag.

In one variant, the first partial section, which is to be placed on the second partial section, is arranged such that the (imaginary) prolongation of the lower section of the side gas bag serves as a folding line. In the inflated condition, the lower edge is essentially a straight line again, as in conventional side gas bags.

The front end of the side gas bag may have a non-inflatable section which is attached to the vehicle for bracing. This non-inflatable extension preferably extends in the longitudinal direction of the vehicle even in front of the front inflatable chamber.

In a further embodiment, the front end of the side gas bag, in particular the front inflatable section, is bent through approximately 90 degrees into the vehicle interior in the inflated condition.

The front inflatable section preferably extends in the longitudinal direction of the vehicle between a windshield of the vehicle and the occupant and protrudes so far into the vehicle interior, for example, that it is located at least partly between the vehicle occupant and the windshield or, if provided, the front gas bag in this direction.

Preferably, in the inflated condition the front inflatable section rests against the front gas bag. This support stabilizes that part of the side gas bag that projects into the vehicle interior and in this way also enhances the ramp effect which is intended to direct the vehicle occupant away from the A-pillar and into the front gas bag.

BRIEF DESCRIPTION OF THE DRAWINGS

FIGS. 6 to 13 show different views of a vehicle occupant restraint system according to a fourth embodiment of the invention, partly in the inflated and partly in the non-inflated condition of the side gas bag.

DETAILED DESCRIPTION OF PREFERRED EMBODIMENTS

Figure 1:
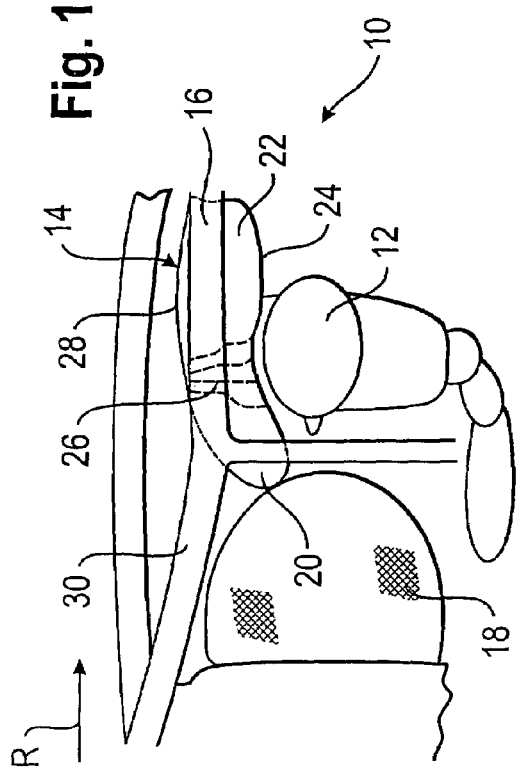
FIG. 1 shows a schematic top view onto a vehicle occupant restraint system according to a first embodiment of the invention.

FIG. 1 shows a vehicle occupant restraint system 10, which helps protect a vehicle occupant 12 in an accident. The vehicle occupant restraint system 10 contains a curtain-like side gas bag 14, only the front end of which is shown in FIG. 1. Before its activation, the side gas bag 14 is arranged folded along a roof frame 16 and, in the deployed condition, it fully or partly covers the side windows of the vehicle.

In addition, a front gas bag 18 of a conventional design is part of the vehicle occupant restraint system 10 shown here.

The front gas bag 18 may be arranged in the instrument panel on the front passenger side and in the steering wheel on the driver's side.

The side gas bag 14 is configured such that in an inflated condition a front inflatable section 20 at the front end of the side gas bag 14, directed into the vehicle interior, has a larger extension than an inflatable portion 22 adjoining the front inflatable section 20 in a longitudinal direction R of the vehicle. The front inflatable section 20 projects—perpendicularly to the longitudinal direction R of the vehicle—further into the vehicle interior than the inflatable portion 22 adjoining it. The inflatable portion 22 is situated laterally of the occupant, roughly in front of or in the region of a B-pillar of the vehicle.

There may be a purely imaginary separation between the front inflatable section 20 and the inflatable portion 22 adjoining the former, as is indicated in FIG. 1, where the two parts of the side gas bag 14 constitute one single inflatable chamber, or else these two parts may be separated from each other wholly or partly by non-inflatable portions.

The front inflatable section 20 is arranged such that it is located in the area of an A-pillar 30, covering it at least partially. In the event of an impact, the front inflatable section 20, which is directed into the vehicle interior and is formed and acting like a ramp, guides the vehicle occupant 12 away from the A-pillar 30 into the inside of the vehicle and into the front gas bag 18.

In all of the embodiments, the side gas bag 14 and the front gas bag 18 may be coordinated with each other such that at least at the moment of impingement of the vehicle occupant 12, the side gas bag 14 can rest by its front inflatable section 20 against the inflated front gas bag 18 in order to promote the guidance effect of the front inflatable section 20.

In the embodiment shown in FIG. 1, at its front end the side gas bag 14 describes a curvature into the vehicle interior. In this case, this curvature is obtained in that one or more gathering seams 26 are formed in an inboard wall 24 of the side gas bag 14, each of the gathering seams 26 connecting at least two sections of the wall 24 with each other to shorten the extension thereof in the longitudinal direction R of the vehicle. Now since the inboard wall 24 is shorter than the opposite, outboard wall 28, in the filled condition the front end of the side gas bag 14 will bend towards the vehicle interior. The gathered length of the wall 24 and the number and arrangement of the gathering seams 26 that are used is, of course, within the discretion of a person of ordinary skill in the art, as is the degree of curvature into the interior to be achieved, which is dependent thereon.

Figure 2:
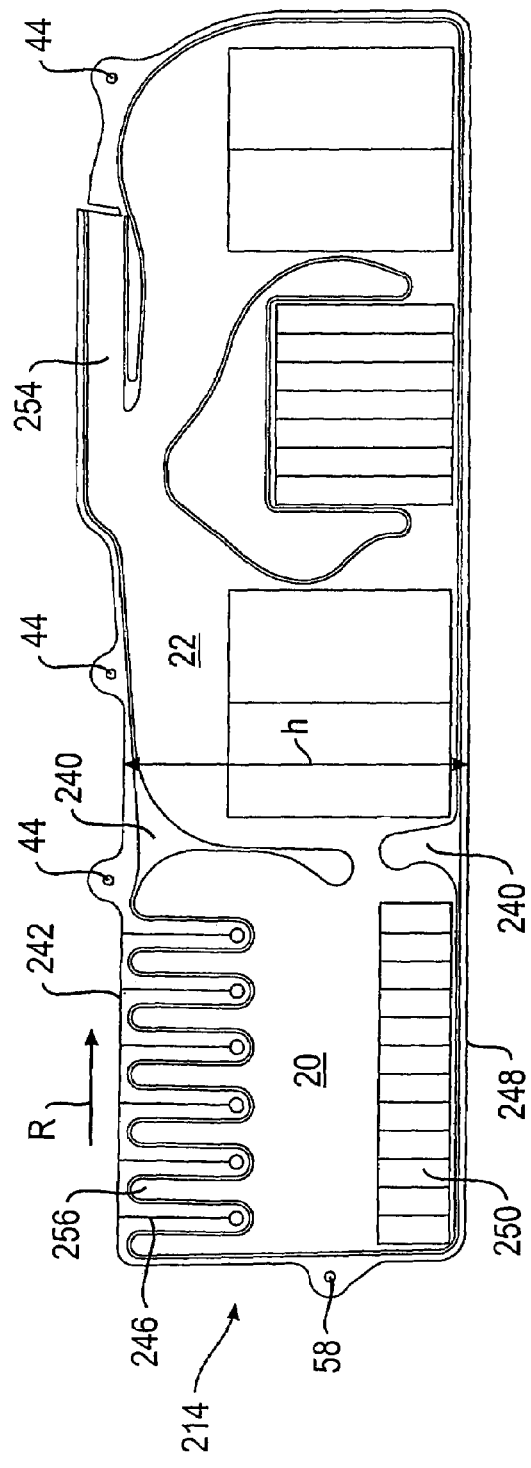
FIG. 2 shows a flat spread out, non-inflated side gas bag of a vehicle occupant restraint system according to a second embodiment of the invention.

FIG. 2 shows a side gas bag 214 for a second embodiment of a vehicle occupant restraint system. The side gas bag 214 replaces the side gas bag 14 described above; otherwise, the vehicle occupant restraint system 10 is identical.

The side gas bag 214 is preferably woven in one piece, i.e. the inboard wall 24 and the subjacent outboard wall 28 which is of identical design (not visible in FIG. 2) are woven at the same time, the outer boundaries and non-inflatable, inside portions and subdivisions each forming a single layer. The side gas bag 214 is configured such that it can be spread out flat.

In this example, the front inflatable section and the adjacent inflatable portion 22 are almost completely separated from each other by two non-inflatable portions 240.

In its condition fitted to the vehicle, the side gas bag 214 is attached to the roof frame 16 by means of attachment points 44 which are arranged at an upper edge 242 of the side gas bag 214.

The upper edge 242 of the front inflatable section 20 runs in a wavy shape. It features a plurality of parallel incisions 246 which in this case extend over almost one third of a height h of the side gas bag 214. Inflatable fingers 256 are produced between the incisions 246. As a result, the length of the upper edge of the inflatable section 20 is greater than that of the outer contour of the side gas bag 214 in this area. In the installed condition, the upper edge 242 extends freely in the area of the front inflatable section 20.

When the side gas bag 214 is filled with gas from a gas generator 52 which is shown, e.g., in FIG. 10 (and which, like the attachment points 44, may be provided in an identical or altered form in all of the embodiments) via an inflation tube 254 formed on the side gas bag 214, the inflatable fingers 256 situated between the incisions 246 will fill. The increase in volume results in a bulging of the front inflatable section 20, so that the latter bends into the interior of the vehicle.

The wave shape of the upper edge 242 could, of course, also be obtained by any other suitable configuration of indentations or incisions.

At a lower edge 248, opposite the upper edge 242, an area that includes means 250 for limiting the distance between the two walls 224, 228 to a specific predefined extent is provided in the front inflatable section 20. In the example shown, so-called X-tethers are used which consist of threads that leave the composite threads of one of the walls 228, 224 and run some distance through the side gas bag 214 to enter the composite threads of the respective other wall 224, 228. Means of this type may be provided at different places and for different distances of the gas bag walls 224, 228.

The side gas bag 214 may be attached, e.g., to the A-pillar 30 by a further attachment point 58 which is arranged at the front end of both the side gas bag 214 and the front inflatable section 20.

Figure 3:
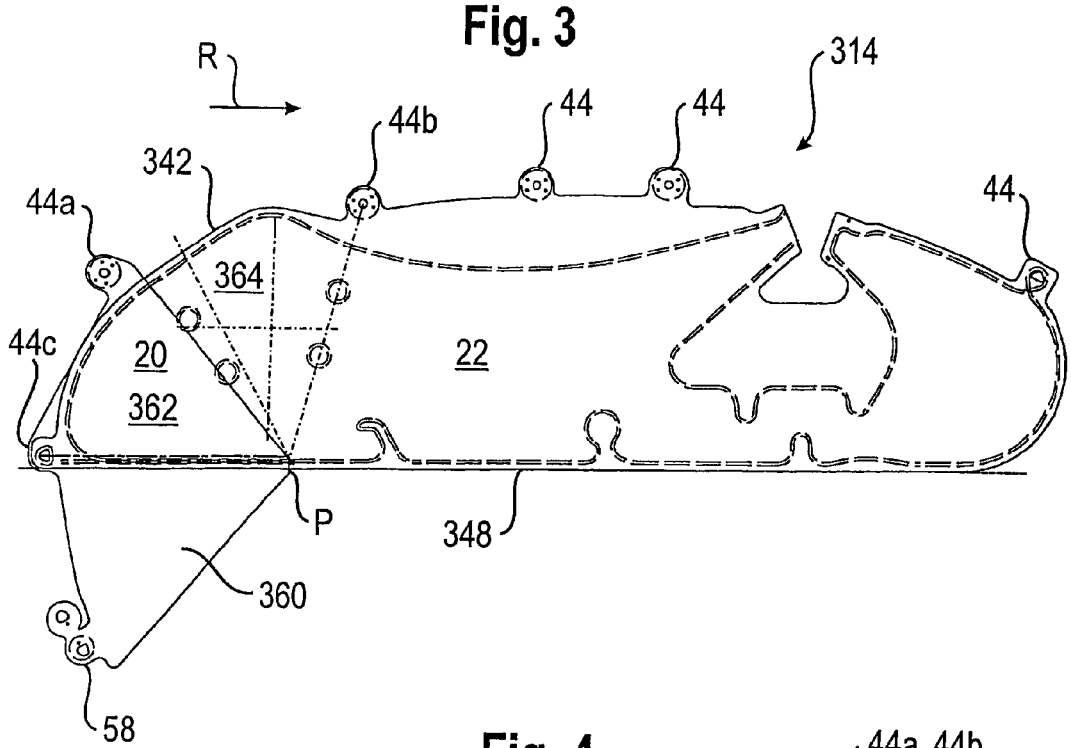
FIG. 3 shows a flat spread out, non-inflated side gas bag of a vehicle occupant restraint system according to a third embodiment of the invention.
Figure 4:
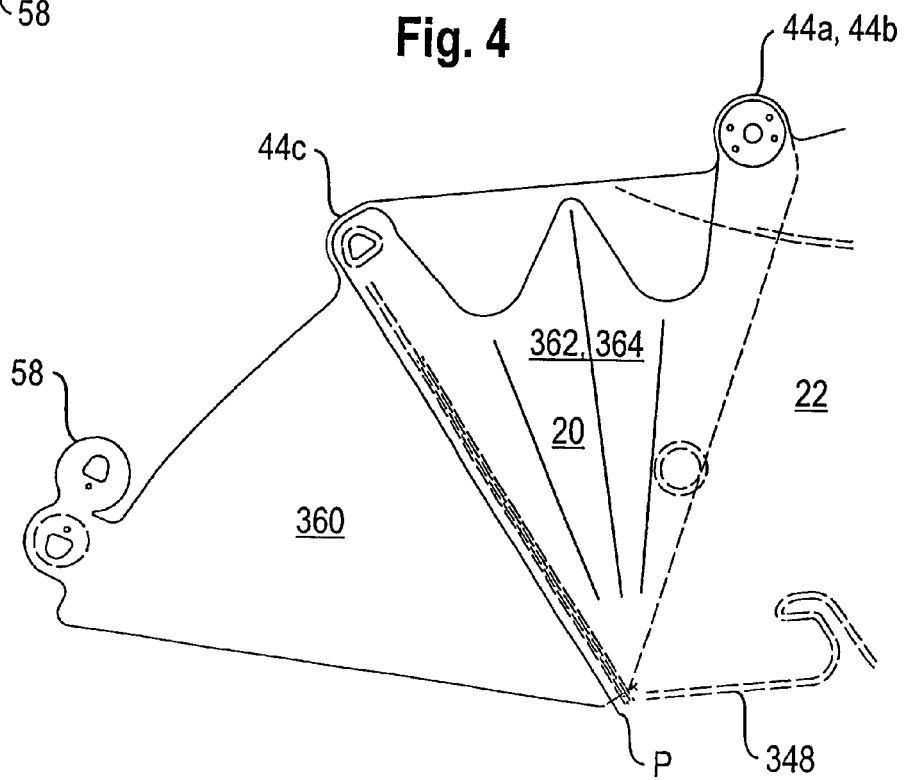
FIG. 4 shows a detail of the side gas bag of FIG. 3.

FIGS. 3 and 4 show a side gas bag 314 for a third embodiment of a vehicle occupant restraint system 10.

FIG. 3 illustrates the side gas bag 314 in a flat spread out, non-inflated form. In this condition, the side gas bag 314 has the shape of a conventional curtain-type gas bag which has applied to its front end additionally a sector-shaped section 360 which projects beyond an (imaginary) prolongation of a straight lower edge section 348. The section 360 starts at the lower edge at a point P roughly at the rear end of the front inflatable section 20 as viewed in the longitudinal direction R of the vehicle. In the example shown, the section 360 is designed in the form of a non-inflatable section, but it could be inflatable, e.g. as a part of the front inflatable section 20.

The front inflatable section 20 is subdivided here into two adjacent imaginary partial sections 362, 364, which are to be viewed as having a sector shape, originating from the point P. During installation in the vehicle, the first inflatable partial section 362 is folded over onto the second inflatable partial section 364 along a line running through the point P. This is effected in that an attachment point 44a (at the upper edge 342 of the side gas bag 314) associated with the first partial section 362 is placed onto an attachment point 44b associated with the second partial section 364 in the longitudinal direction R of the vehicle and is attached to the vehicle together with the attachment point 44b (see FIG. 4). As a result, the attachment point 44c shown at the foremost end of the side gas bag 314 in FIG. 3 will automatically move some distance in the longitudinal direction R of the vehicle to that point where the attachment point 44a was in FIG. 3. The attachment point 44c is anchored to the vehicle at the position shown in FIG. 4. The section 360 along with its attachment point 58 now constitutes the front end of the side gas bag 314. In the installed and inflated condition, the lower edge of the side gas bag 314 runs in an approximately straight line again. The attachment point 58 at the very front is now situated at a place where it can be attached, e.g., to the A-pillar 30 of the vehicle.

This type of attachment of the side gas bag 314 results in that in some parts of the area of the front end, three layers of the front inflatable section 20 overlie one another in the inflated condition. This leads to an increase in the depth of the side gas bag 314 towards the vehicle interior and, just as in the embodiments already described above, the front inflatable section 20 forms a ramp which is suitable to deflect the vehicle occupant 12 into the interior of the vehicle and direct him/her into the front gas bag 18.

The side gas bag 314 is first brought into the shape as shown in FIG. 3 and is folded and attached to the vehicle in this shape. It is not required to attach the partial sections 362, 364 to the side gas bag 314.

Figure 5:
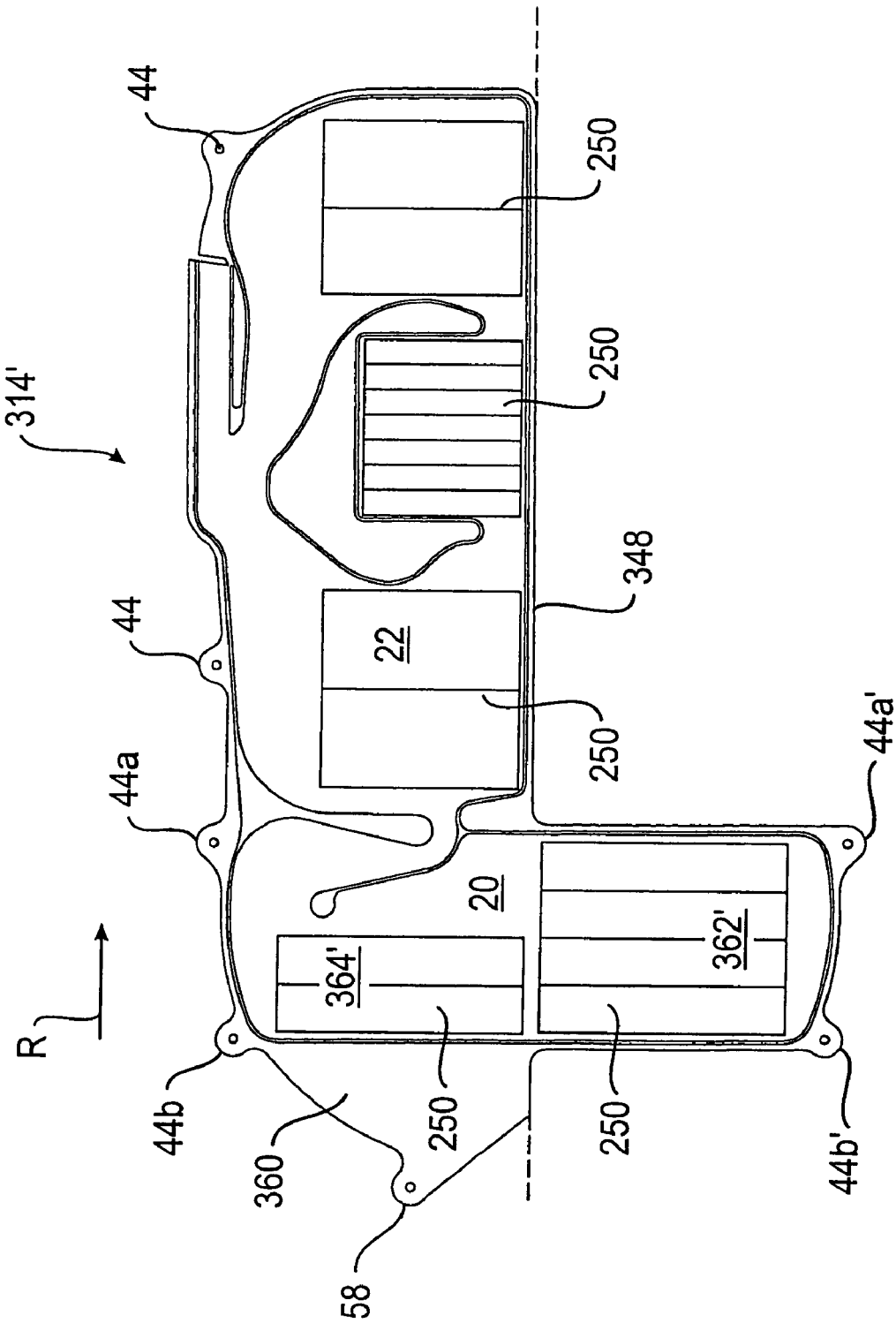
FIG. 5 shows a flat spread out, non-inflated side gas bag of a vehicle occupant restraint system according to a variant of the third embodiment of the invention.
Figure 6:
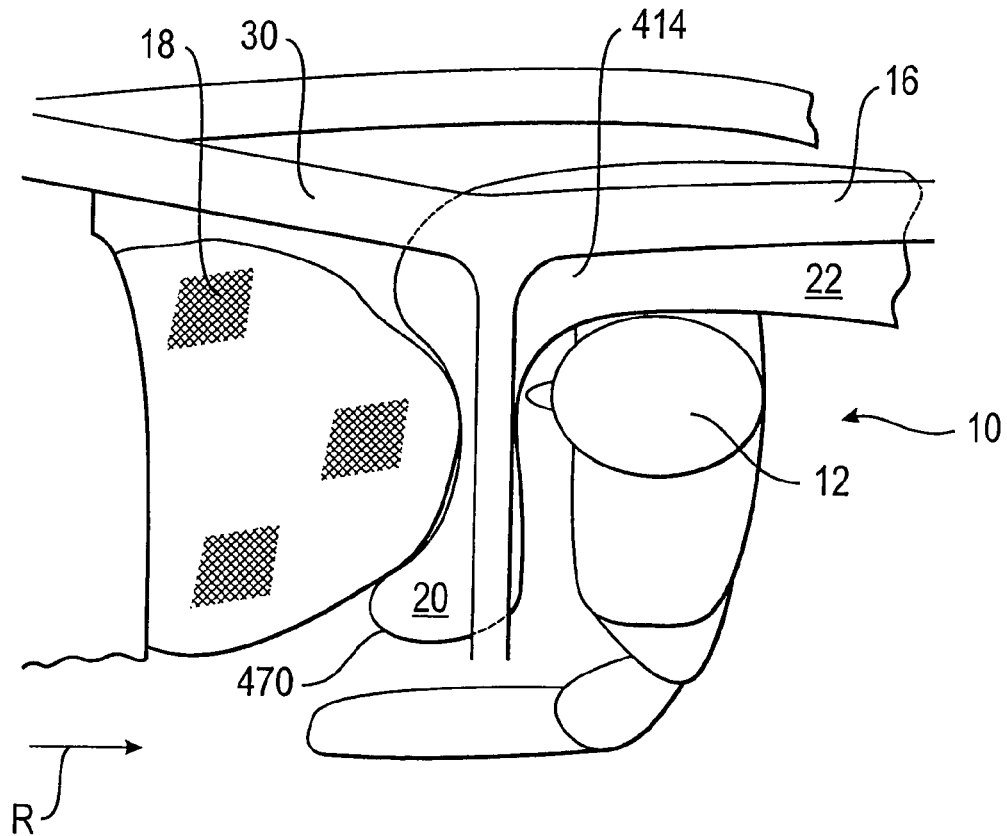
Figure 7:
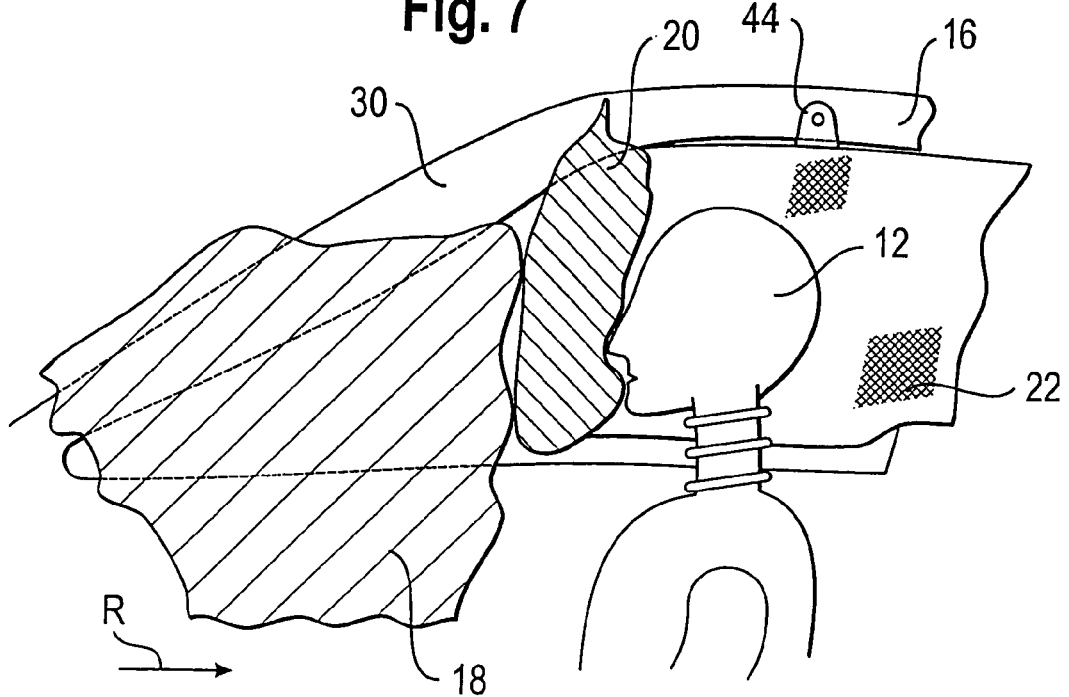

FIG. 5 shows a variant of the third embodiment. In the side gas bag 314', the first inflatable partial section 362' of the front inflatable section 20 is applied to the straight, lower edge section 348 of the side gas bag 314' perpendicularly to the longitudinal direction R of the vehicle, so that it projects roughly at right angles to the lower edge section 348. Two attachment points 44a', 44b' are formed at its lower end in FIG. 5. The first inflatable partial section 362' is folded along the connecting line between the first inflatable partial section 362' and the second partial section 364' and onto the second inflatable partial section 364'. In so doing, the attachment points 44a and 44a' and the attachment points 44b and 44b', respectively, will come to coincide. The side gas bag 314' is folded and is attached to the vehicle such that the pairs of attachment points 44a, 44a' and 44b, 44b', respectively, are jointly fixed in the vehicle at the same place. Accordingly, the side gas bag 314' is double-layered in the area of the front inflatable section 20.

When the side gas bag 314' is in its inflated condition, this design results in that the side gas bag 314' has a larger depth reaching into the vehicle interior in the area of the front inflatable section 20 and protrudes farther into the vehicle interior than the adjoining inflatable portion 22. Here, too, the front inflatable section 20 constitutes a ramp that deflects the vehicle occupant 12 towards the interior of the vehicle.

Also in this case, a further section 360, which is not inflatable here, is formed on the foremost end of the side gas bag 314', which has an attachment point 58 for attaching the section 360 to, e.g., the A-pillar 30.

FIGS. 6 through 13 show a further embodiment of a vehicle occupant restraint system 10.

Figure 12:
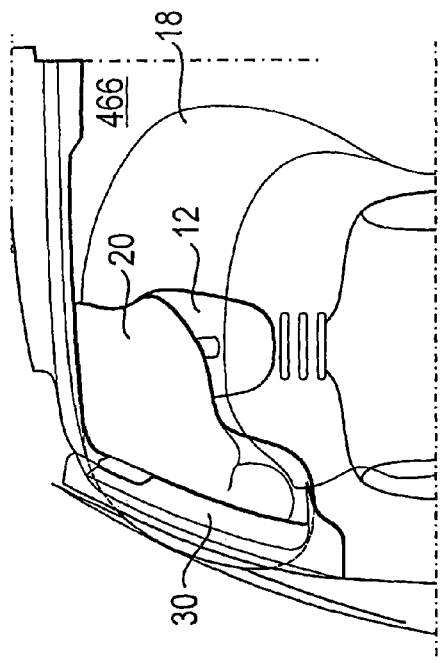
Figure 11:
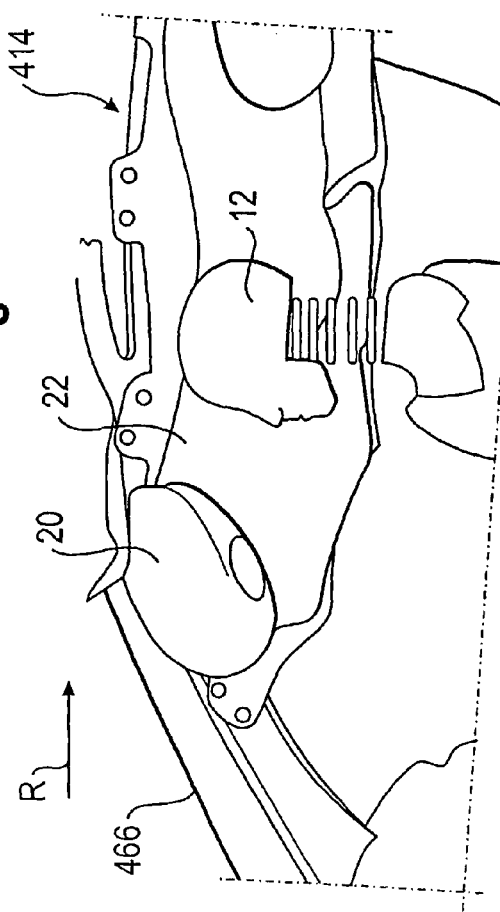
Figure 13:
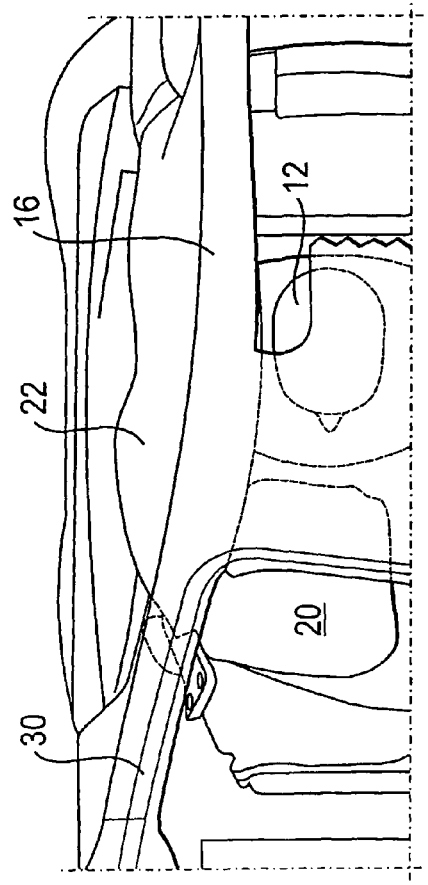

In this embodiment, the side gas bag 414 is of a design such that the front inflatable section 20 is bent through virtually 90 degrees in relation to the adjoining inflatable portion 22 towards the vehicle interior. The front inflatable section 20 here extends so far into the vehicle interior that its inboard end 470 reaches at least as far as to the vicinity of the inboard shoulder of the vehicle occupant 12 and, as shown from above in FIG. 6, has a large overlap with the front gas bag 18. In the vertical direction, the front inflatable section 20 can extend downward so far as the adjoining inflatable portion 22 (FIGS. 7, 8) or else can be shorter (FIGS. 11, 12).

In the longitudinal direction R of the vehicle, the front inflatable section 20 extends between the occupant and the front gas bag 18, so that upon a forward movement (contrary to the longitudinal direction R of the vehicle), the vehicle occupant 12 will come into a frontal contact with the front inflatable section 20. The side gas bag 414 and the front gas bag 18 are matched with each other such that at least upon the impact of the vehicle occupant 12 onto the front inflatable section 20, the front inflatable section 20 will be supported at the front gas bag 18 (see, e.g., FIG. 6).

In FIG. 10 it can be seen that with the side gas bag 414 folded and fitted to the vehicle, it is arranged along the roof frame 16 and along the upper edge of a windshield 466. The attachment point 58 at the very front is situated here roughly in the middle of the vehicle above the windshield 466. This arrangement predefines the curvature of the side gas bag 414 into the vehicle interior. Additional stability is given to the side gas bag 414 by it being supported at the front gas bag 18.

In this case, the front inflatable section 20 may be configured such that it forms a ramp which is directed into the vehicle interior in that region in which the side gas bag 414 still runs at the roof frame 16 along the longitudinal side of the vehicle immediately before it continues into the curvature into the vehicle interior.

This can be achieved, for example, by features of the embodiments described above.

In the event of an accident, the vehicle occupant 12 is in this way directed towards the vehicle interior by the side gas bag 414 and is furthermore cushioned there by the front inflatable section 20.

All of the features of the embodiments described may be combined with or substituted for each other within the discretion of one of ordinary skill in the art, in order to optimize the vehicle occupant restraint system 10.

The invention claimed is:

1. A vehicle occupant restraint system comprising:
a side gas bag (14; 214; 314; 314'; 414) which in a folded condition is arranged folded along a roof frame (16) of a vehicle,
the side gas bag (14; 214; 314; 314'; 414) having a front inflatable section (20) at a front end of the side gas bag (14; 214; 314; 314'; 414) and an inflatable portion (22) adjoining the front inflatable section (20) in the longitudinal direction (R) of the vehicle,
the side gas bag (14; 214; 314; 314'; 414) being configured such that in an inflated condition the front inflatable section (20) projects further into the vehicle interior than the inflatable portion (22) adjoining the front inflatable section (20), wherein in the inflated condition the side gas bag (314; 314') is folded over in the region of the front inflatable section (20), so that a first inflatable partial section (362; 362') lies on a second inflatable partial section (364; 364').

2. The vehicle occupant restraint system according to claim 1, wherein the side gas bag (14; 214; 314; 314'; 414) is of a curtain-type design.

3. The vehicle occupant restraint system according to claim 1, wherein the front inflatable section (20) covers part of an A-pillar (30) of the vehicle.

4. The vehicle occupant restraint system according to claim 1, wherein the front inflatable section (20) forms a ramp directed into the vehicle interior.

5. The vehicle occupant restraint system according to claim 1, wherein the front inflatable section (20) exhibits a curvature into the vehicle interior.

6. The vehicle occupant restraint system according to claim 1, wherein in a flat spread out condition, the side gas bag (314) has two attachment points (44a, 44b) on the edge of the front inflatable section (20) and the two attachment points (44a, 44b) lie one on top of the other when the side gas bag (314) is installed in the vehicle and is in its inflated condition.

7. The vehicle occupant restraint system according to claim 1, wherein a partial section (362) of the front inflatable section (20) is folded over along a line running through a point (P) at the lower edge (348) of the side gas bag (314).

8. The vehicle occupant restraint system according to claim 1, wherein the side gas bag (314; 314') has a straight lower edge section (348) and, in the flat spread out condition of the side gas bag (314; 314'), a section at the front end of the side gas bag (314; 314') projects beyond a prolongation of the lower edge section (348) of the side gas bag (314; 314').

9. The vehicle occupant restraint system according to claim 8, wherein in the installed and inflated condition of the side gas bag (314'), the first inflatable partial section (362') is folded over substantially perpendicular to the prolongation of the lower edge section (348) of the side gas bag (314').

10. The vehicle occupant restraint system according to claim 1, wherein in at least one of the inflatable sections (20, 22), means (250) are provided which limit the distance of the gas bag walls (24, 28) in the inflated condition of the side gas bag (14; 214; 314; 314'; 414).

11. The vehicle occupant restraint system according to claim 1, wherein the front end of the side gas bag (314; 314') has a non-inflatable section (360) which is attached to the vehicle for bracing.

12. The vehicle occupant restraint system according to claim 1, wherein the front inflatable section (20) of the side gas bag (414) in the inflated condition is bent through approximately 90 degrees into the vehicle interior.

13. The vehicle occupant restraint system according to claim 1, wherein a separate front gas bag (18) is provided additionally and in the inflated condition the front inflatable section (20) can rest against the front gas bag (18).

14. The vehicle occupant restraint system according to claim 1, wherein the front inflatable section (20) extends in the longitudinal direction of the vehicle between a windshield (466) of the vehicle and the vehicle occupant (12).

* * * * *